US007363193B2

(12) United States Patent
Jacobs et al.

(10) Patent No.: US 7,363,193 B2
(45) Date of Patent: Apr. 22, 2008

(54) SAFETY MANAGEMENT SYSTEM AND METHOD

(76) Inventors: John M. Jacobs, 5 Wildbird La., Hilton Head, SC (US) 29926; Joshua D. Jacobs, 5257 W. Pensacola Ave., Chicago, IL (US) 60641; Colleen M. Jardine, 51 Lockhart Rd., Collingwood, ONT (CA) L9Y 4M1

( * ) Notice: Subject to any disclaimer, the term of this patent is extended or adjusted under 35 U.S.C. 154(b) by 1164 days.

(21) Appl. No.: 10/123,233

(22) Filed: Apr. 16, 2002

(65) Prior Publication Data

US 2003/0033123 A1 Feb. 13, 2003

Related U.S. Application Data

(60) Provisional application No. 60/284,052, filed on Apr. 16, 2001.

(51) Int. Cl.
G06F 11/30 (2006.01)
(52) U.S. Cl. .................. 702/182; 709/224; 705/40; 705/1; 703/2
(58) Field of Classification Search ............... 702/182; 709/251, 226, 213, 224, 219; 703/2; 705/1, 705/40
See application file for complete search history.

(56) References Cited

U.S. PATENT DOCUMENTS

| | | | |
|---|---|---|---|
| 4,803,039 A | | 2/1989 | Impink, Jr. et al. |
| 5,185,699 A | | 2/1993 | Reiner et al. |
| 5,210,704 A | * | 5/1993 | Husseiny .................. 702/34 |
| 5,311,562 A | * | 5/1994 | Palusamy et al. .......... 376/215 |
| 5,726,884 A | | 3/1998 | Sturgeon et al. |
| 6,049,776 A | | 4/2000 | Donnelly et al. |
| 6,055,551 A | | 4/2000 | Heinlein et al. |
| 6,078,255 A | | 6/2000 | Dividock et al. |
| 6,097,995 A | | 8/2000 | Tipton et al. |
| 6,370,448 B1 | * | 4/2002 | Eryurek .................. 700/282 |
| 6,557,118 B2 | * | 4/2003 | Schleiss et al. ............ 714/37 |
| 6,633,782 B1 | * | 10/2003 | Schleiss et al. ............ 700/26 |
| 6,654,697 B1 | * | 11/2003 | Eryurek et al. ............ 702/47 |

(Continued)

OTHER PUBLICATIONS

Web page: ISM, "Hazards Control Computer Assisted Instruction" © 2000 University of California.

(Continued)

*Primary Examiner*—Carol S. W. Tsai
(74) *Attorney, Agent, or Firm*—Woodard, Emhardt, Moriarty, McNett & Henry LLP

(57) ABSTRACT

A safety management system includes a processor and memory in which a safety database is maintained. The safety management system receives safety data from one or more portable devices and/or computers, and the system stores this safety data in the database. When a safety incident occurs, such as an accident, the type of incident is recorded and additional information about the incident is recorded in the database. This information then is used to generate a model of the rate of safety incidents. This model is then used to forecast future safety incidence rates for planning and budgeting purposes.

18 Claims, 15 Drawing Sheets

U.S. PATENT DOCUMENTS

| | | | |
|---|---|---|---|
| 6,735,484 B1 * | 5/2004 | Lenz | 700/51 |
| 6,738,748 B2 * | 5/2004 | Wetzer | 705/9 |
| 6,859,755 B2 * | 2/2005 | Eryurek et al. | 702/183 |
| 7,079,984 B2 * | 7/2006 | Eryurek et al. | 702/185 |
| 7,089,154 B2 * | 8/2006 | Rasmussen et al. | 702/183 |
| 2002/0004778 A1 | 1/2002 | Torii | |
| 2002/0113695 A1 | 8/2002 | Ernst et al. | |
| 2003/0040878 A1 * | 2/2003 | Rasmussen et al. | 702/85 |
| 2006/0085367 A1 * | 4/2006 | Genovese | 706/44 |

OTHER PUBLICATIONS

Rockwell Automation DataMyte Web Site. DataMyte DigiForm™, Apr. 10, 2001, © 2001 Rockwell International.

Saf-T-Man™ Safety Manager web page; © 1996 Safety Training and Tracing, Inc.

Safety Training and Tracing home web page. © 1996 Safety Training and Tracing, Inc.

* cited by examiner

SAFETY MANAGEMENT SYSTEM AND METHOD

REFERENCE TO RELATED APPLICATION

This application claims the benefit of U.S. Provisional Patent Application Ser. No. 60/284,052, filed Apr. 16, 2001, which is hereby incorporated by reference in its entirety.

BACKGROUND OF THE INVENTION

The present invention generally relates to a safety management systems, and more specifically, but not exclusively, concerns a safety management system that is adapted to store a number of safety parameters that are used in modeling future safety incidence rates.

Safety is always an important concern for companies. Poor safety can directly impact the profitability of a company. Understanding the factors that contribute to safety, or the lack thereof, and the interrelation of those factors to one another requires complex synthesis and analysis of information from numerous sources. The task of compiling, synthesizing, and analyzing such information can be a daunting and time-consuming task. Results from this analysis process are often not available in a sufficiently expeditious or detailed manner to allow for the effective and prompt implementation of safety improvements. The inefficiency and expense involved in the process of compiling, synthesizing, and analyzing safety-related information is compounded by the need to homogenize data from numerous sources using differing media in order to utilize the data in a meaningful way. In addition, the means to record safety-related data often are not readily available in the workplace, and/or those means are outmoded and/or difficult to use. As a result, such data is not accurately recorded or is not recorded at all. Personnel often do not appreciate and/or understand the importance of the data being collected, and thus do not record the data or do so in a contentious fashion. Safety data collection systems also typically fail to address safety problems that exist outside work, but which may impact the work of personnel.

Safety prevention is another area of concern with safety programs. Personnel have to be trained and supplied current and accurate documentation in order to prevent accidents from occurring. Often such documentation supplied to personnel is not readily available and when available often the information contained therein is outdated. Proper training of personnel is one of many important factors in combating accidents. Typically, training records of personnel are maintained, if at all, by a human resources department, and these records are generally not incorporated into the overall safety management program. If management becomes aware of a problem, certain reoccurring accidents by personnel can be prevented by implementing proper training programs. By having this disconnect between training and safety programs, often many of these types of safety problems are left unsolved.

In addition, the economic impact of safety is generally not factored into the decision making and/or budgeting processes because there does not exist a safety system that can accurately predict future safety rates. Management often, if at all, base their decisions on historical safety rates. However, typically these historical rates are inaccurate due to improper record collection. Further, changes in organizational conditions can drastically affect the safety rates. For example, an increase in production rates for a specific product may drastically increase the number of accidents. This dramatic increase in accidents may greatly offset any profits gained from the increased production. Without being able to understand the factors that affect safety, companies are blind on how their decisions affect safety, which in turn prevents them from making educated planning/budgeting decisions. Inaccurate safety forecasting, for example, can also prevent companies from precisely budgeting cash reserves for their insurance carriers.

Therefore, there has been a long felt need for a safety management system that can improve safety related data collection and at the same time improve safety forecasting.

SUMMARY OF THE INVENTION

One form of the present invention concerns a unique safety management system. Other forms concern unique systems, apparatus and techniques for collecting safety data and forecasting future safety rates.

In one form, a safety management system is operatively coupled over a computer network to one or more data entry devices. The safety management system includes a database that stores safety related data. At least a portion of the safety related data is transferred to and synchronized with the data entry devices. Users collect and enter safety-related data into the devices. This safety data in the devices is then transferred to the safety management system. The safety management system uses the collected safety data to forecast future safety rates.

Other forms, embodiments, objects, features, advantages, benefits and aspects of the present invention shall become apparent from the detailed drawings and description contained herein.

BRIEF DESCRIPTION OF THE DRAWINGS

FIG. 25 is a flow diagram illustrating a safety incidence rate modeling technique according to one embodiment of the present invention.

DESCRIPTION OF THE PREFERRED EMBODIMENTS

Figure 1:
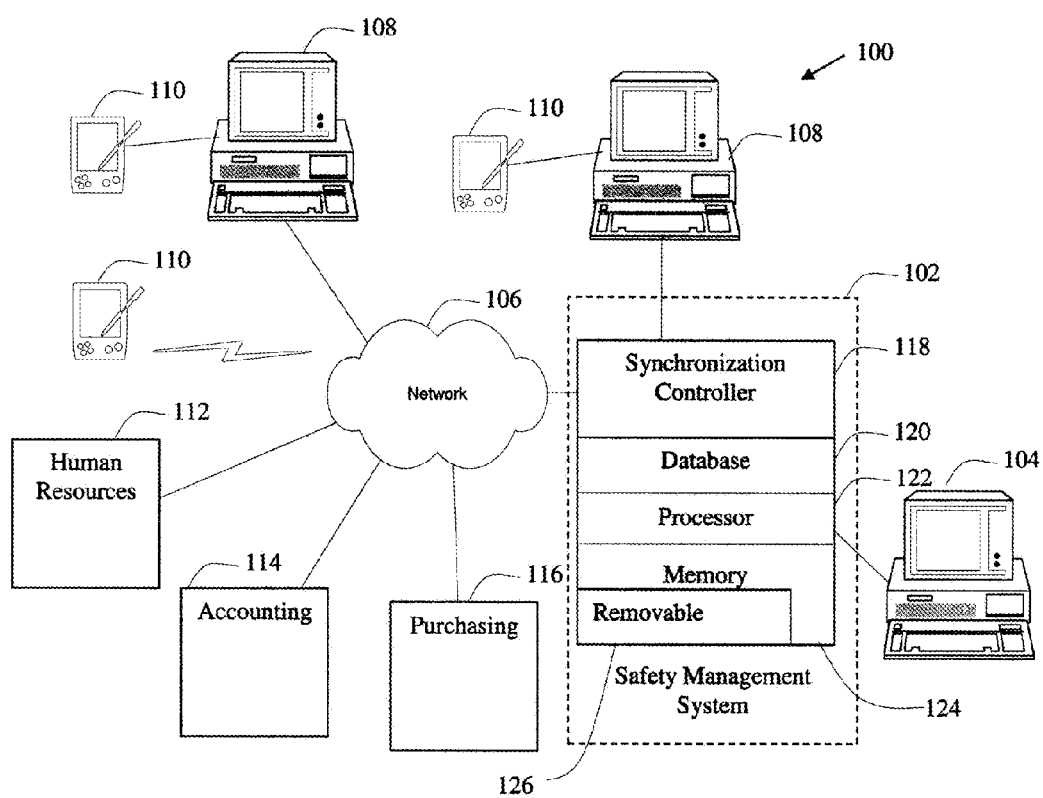
FIG. 1 is a diagrammatic view of a system according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the art that some of the features which are not relevant to the invention may not be shown for the sake of clarity.

A number of exemplary screens/forms will be used in order to explain the present invention. It should be noted that the present invention is not intended to be limited to only the screens/forms shown in the drawings. As should be understood, screen designs containing additional fields and/or field combinations different from the ones described herein can also be used.

FIG. 1 depicts a computer system 100 according to one embodiment of the present invention in diagrammatic form. Computer system 100 includes a safety management system 102, an administrative computer 104, a computer network 106, client computers 108, portable devices 110, human resources system 112, accounting system 114 and purchasing system 116. Administrative computer 104 is operatively coupled to safety system 102, and safety system 102 is operatively coupled to the other systems through network 106. As should be appreciated, administrative computer 104 can also be operatively coupled to safety system 102 through network 106. Computers 104 and 108 can include personal computers, computer terminals, and/or other types of devices generally known to those skilled in the art. Administrative computer 104 is used for managing safety system 106, and in one embodiment, administrative computer is a personal computer.

Safety system 102 is used to manage, store, supply, communication and report safety related information. As illustrated, safety system 102 includes a synchronization controller 118, a database 120, processor 122, and memory 124. In one form, safety system 102 is incorporated into a web server and in another form is incorporated into a local area network (LAN) server. Safety system 102 can be located on a single server or distributed over several servers. It should be appreciated that selected components of computer system 100 can be incorporated into a single computer. Synchronization controller 118 is used to synchronize information transfers between database 120 and portable devices 110, and controller 118 can be hardware and/or software based. In one embodiment, synchronization controller 118 is DBSYNC software provided by thinking Bytes Technology, Inc. of Waltham, Mass. In the illustrated form, synchronization controller 118 is incorporated into safety system 102 so as to reduce support costs by ensuring that the proper synchronization software is used when synchronizing information. In alternative form, synchronization controller 118 can be loaded onto each client computer 108 and/or portable device 110. Processor 122 of safety system 102 may be comprised of one or more components. For a multi-component form of processor 122, one or more components can be located remotely relative to the others, or configured as a single unit. Furthermore, processor 122 can be embodied in a form having more than one processing unit, such as a multiprocessor configuration, and should be understood to collectively refer to such configurations as well as a single-processor based arrangement. One or more components of the processor 122 may be of the electronic variety defining digital circuitry, analog circuitry, or both. Processor 122 can be of a programmable variety responsive to software instructions, a hardwired state machine, or a combination of these.

Database 120 is used to store safety related information. Database 120 can be a standard file, a combination of files, a standard database program, a relational database, a SQL (structured query language) database, and/or other type of data storage structure as generally known to those skilled in the art. In one embodiment, database 120 is a MICROSOFT ACCESS database (Microsoft Corporation, Redmond, Wash.). Database 120 is stored in a memory 124 associated with the processor 122. Memory 124 can include one or more types of solid state electronic memory, magnetic memory, or optical memory, just to name a few. Memory 124 includes removable memory device 126. Device 126 can be in the form of a nonvolatile electronic memory unit, an optical disc memory (such as a DVD or CD ROM); a magnetically encoded hard disc, floppy disc, tape, or cartridge media; or a combination of these or other removable memory types.

Network 106 can include the Internet, one or more other wide area networks (WAN), a LAN, a proprietary network such as provided by American On Line, Inc., a combination of these, and/or a different type of network generally known to those skilled in the art. As shown, client computers 108 are operatively coupled to safety system 102 either directly or indirectly over network 106. In one form, client computers 108 are used to transfer information between portable devices 110 and safety system 102. Further, computers 108 can be used as data collectors for safety system 102 and can also be used to administer accounts and report information from system 102. When operatively coupled to network 106, computers 108 have software that allows computers 108 to communicate over network 106. This software can include an email application, a web browser, a chat program, proprietary software and other types of client software generally known to those skilled in the art. As should be appreciated for small companies, safety system 102 can be incorporated client computer 108 so as to run as a stand-alone system. For larger companies, computer system 100 can be incorporated into a preexisting computer network system. Alternatively, if a company cannot afford or chooses not to internally support safety system 102, the company can have a third party application service provider (ASP) maintain safety system 102. In that situation, the company can access safety system 102 over the Internet.

Personnel, such as maintenance workers, managers, etc., and other users enter information into portable devices 110 and can review information stored on portable devices 110. Portable devices 110 can include personal digital assistants (PDA's), cell phones, laptop computers and other types of portable devices. In one embodiment, portable devices 110 are a VISOR brand PDA manufactured by Handspring Inc. of Mountain View, Calif. As illustrated, portable devices 110 transmit and receive information from safety system 102 through client computers 108 and/or through a wireless connection with network 106. For example, portable device 110 can be operatively coupled to computer 108 through a docketing station. Synchronization controller 118 synchronizes information transferred between safety system 102 and portable devices 110. Portable devices 110 include software and/or hardware that allow devices 110 to display information from database 120 and allow entry of information into database 120. In one form, this software includes a database program, and in one embodiment, this database program is a THINKDB database provided by thinkingBytes Technology. During synchronization, selected portions of database 120, called "modules", are synchronized with the particular portable device 110. By way of a nonlimiting example, these modules can include specific database tables, forms, files, data, and/or reports from database 120. One of the many advantages of using modules is that memory on portable devices 110 is conserved and process efficiency is improved. Another advantage is that data security and integrity is improved. Only the particular information needed for a particular job is transferred, and not the entire database 120.

Figure 2:
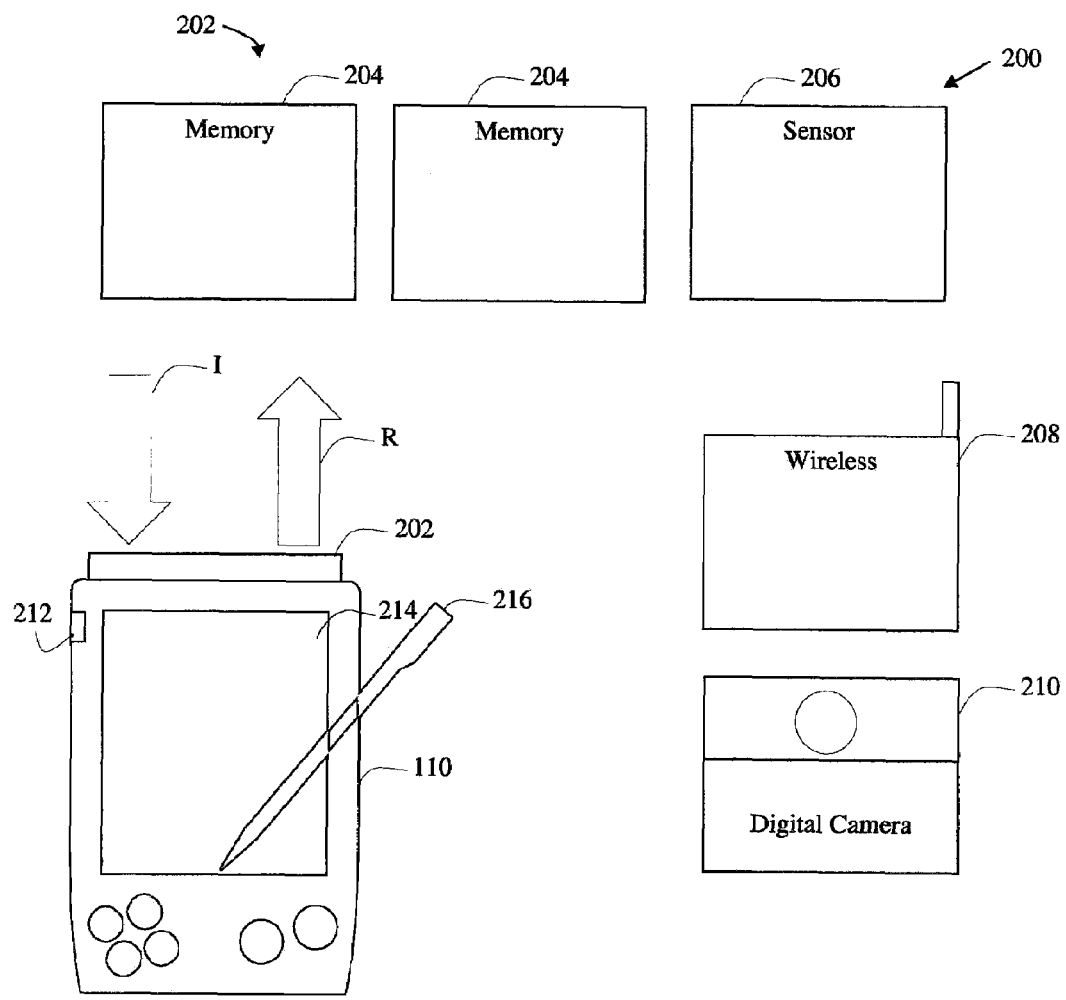
FIG. 2 is a front view of a portable device and associated cards used in the FIG. 1 system.

FIG. 2 illustrates a portable device system 200 according to one embodiment of the present invention. As illustrated, portable device 110 can have a number of device/cards 202 inserted (I) and removed (R) depending on the specific situation. Cards 202, by way of nonlimiting examples, can include memory card 204, sensor 206, wireless communication device 208, and/or digital camera 210. Individual modules can be stored on a single memory card 204 or across multiple memory cards 204. A single memory card 204 can also store multiple modules. One of many advantages with this configuration is that memory cards 204 practically provide an unlimited memory supply for the modules. Further, memory cards 204 allow for the exchange of modules between users. Sensor 206 can be coupled to portable device 110 to automatically enter sensor data. Sensor 206 can include for example temperature sensors, chemical sensors, light sensors and/or other types of sensors. Wireless communication device 208 allows for wireless communication with portable device 110, and pictures can be taken when portable device 110 has digital camera 110 inserted therein. For example, digital camera 110 allows a user to take pictures of accident sites so that the pictures can be stored in database 120 for later analysis. As shown, portable device 110 has an infrared (IR) transceiver 212 that is used to transfer modules and other forms of data between portable devices 110 and/or other devices. Portable device 110 further includes a display 214 for displaying information and an input device 216 for inputting information. In one embodiment, input device 216 is a pen-based input device. It should be appreciated that other types of input devices 216 can be used.

As shown in FIG. 1, safety system 102 is operatively coupled over network 106 to human resources system 112, accounting system 114, and purchasing system 116. Database 120 interfaces with these systems so that the information used by safety system 102 is accurate and current. Safety system 102 can constantly or periodically interface with systems 112, 114 and 116. In one embodiment, database 120 updates linked information daily by issuing SQL requests to systems 112, 114 and 116. For example, database 120 can retrieve and update employee information on human resources system 112. In another example, safety system 102 can automatically place a purchase order with purchasing system 116 when the inventory for certain safety items, such as ear plugs, is low. Database 120, for example, can also generate safety cost reports based on the information stored on accounting system 114. It should be appreciated that safety system 102 can access other types of computer systems and/or different combinations of computer systems.

Figure 3:
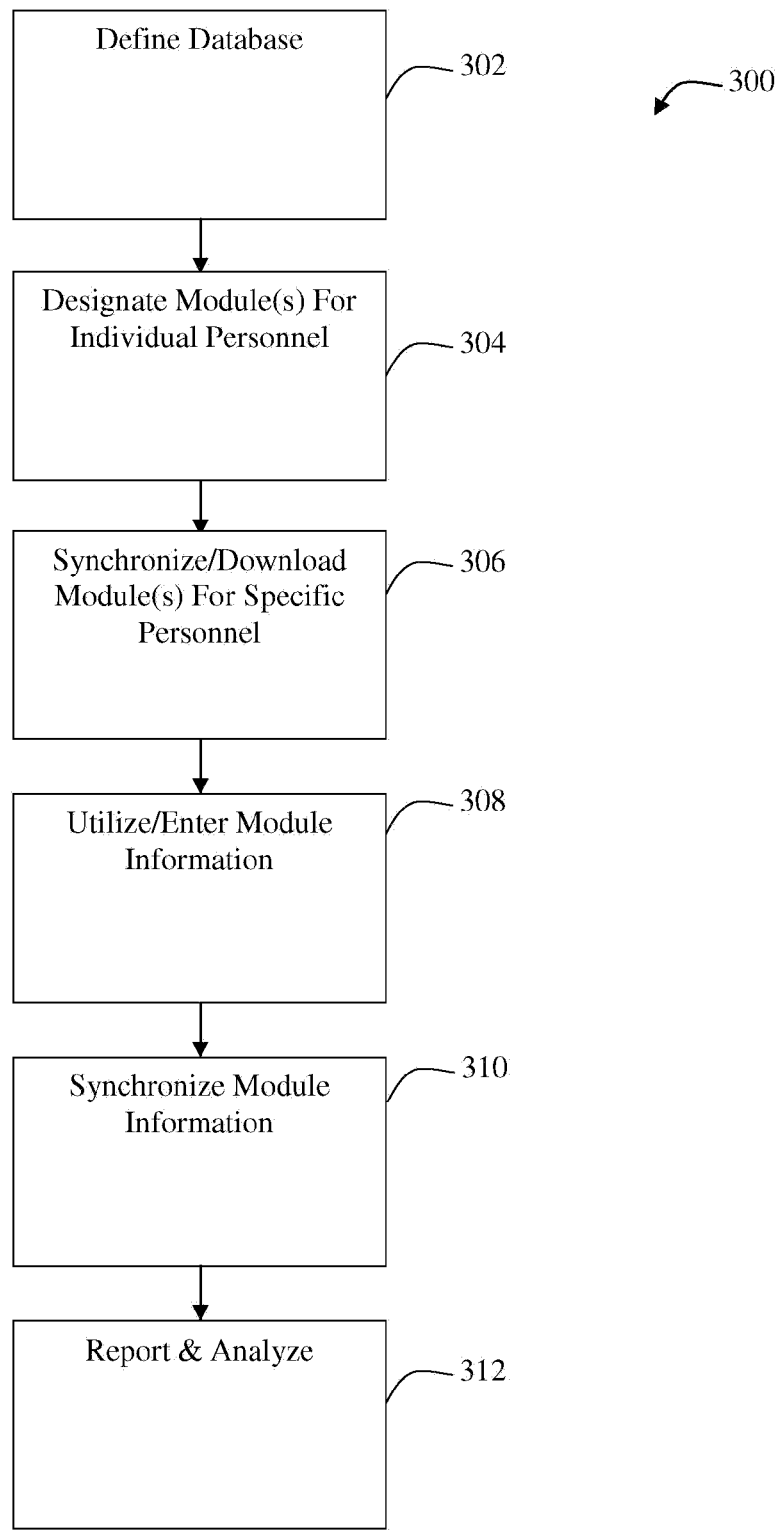
FIG. 3 is a flow diagram illustrating various safety management stages according to one embodiment of the present invention.

Flow diagram 300, which is shown in FIG. 3, will now be used to describe the different phases in developing and using safety 102. It should be understood that the different stages illustrated in diagram 300 can occur simultaneously and/or in a different order than is shown. In stage 302, database 120 is defined. The administrator of safety system 102 through administrative computer 104 can define the database fields, database table structure, forms, modules, reports, and other settings for safety system 102.

Figure 4:
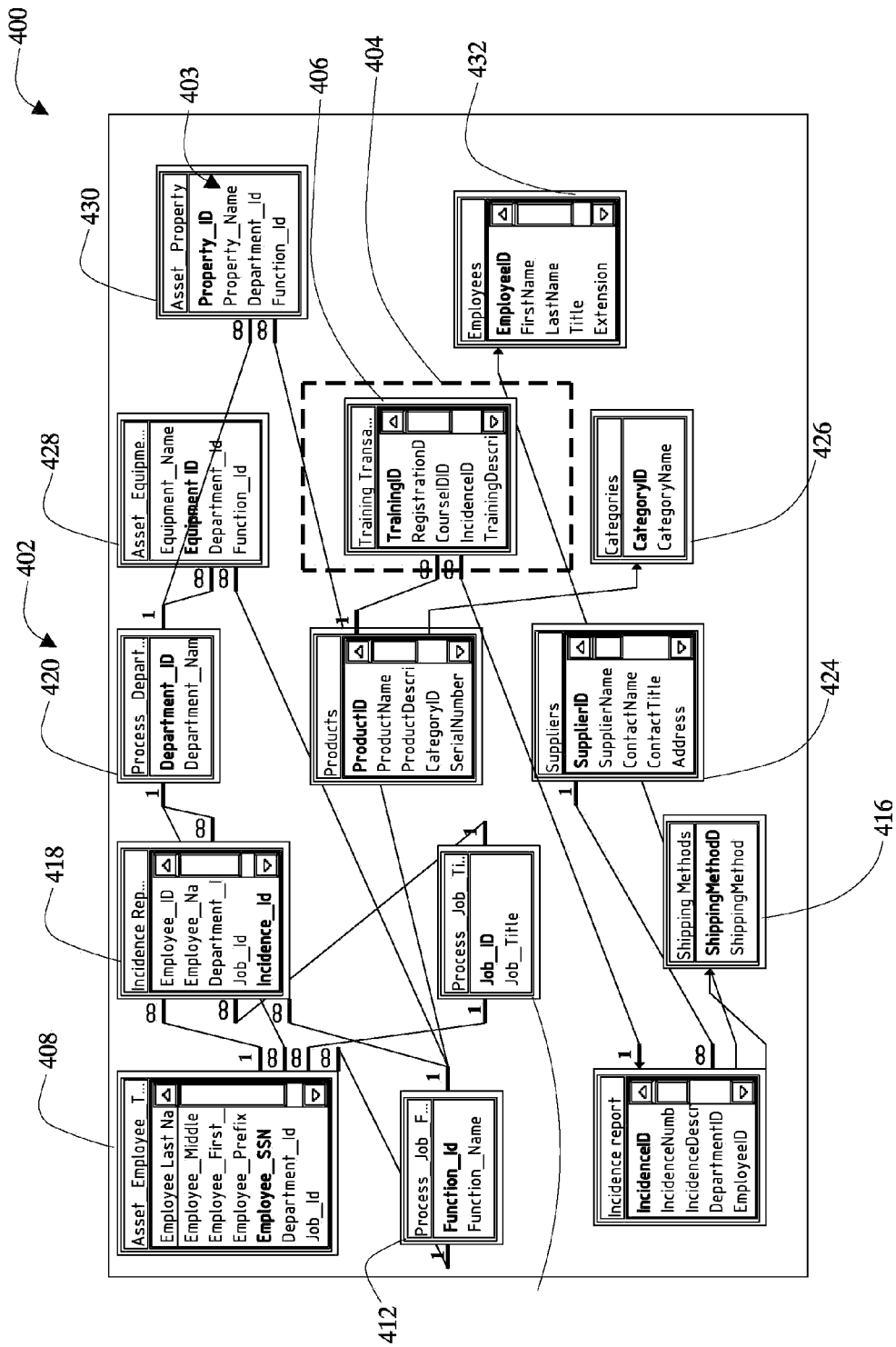
FIG. 4 is an example of a table structure used in the FIG. 1 system.

An example of a table structure 400 for database 120 is illustrated in FIG. 4. It should be appreciated that other types of table structures can be used. As illustrated, table structure 400 includes multiple linked tables 402 that contain fields 403 that relate tables 402 to one another. Among the many benefits of using a relational database structure is that tables 402 can be easily grouped together in different combinations to form different modules. With this relational structure, only table(s) 402 and their related forms and/or reports for the particular module need to be transferred to and synchronized with a given portable device 110 (and/or computer 108). An example of a module is illustrated with training module 404. Training module 404 includes training table 406 and an associated data entry form that is used for data entry on portable device 110 (and/or computer 108). It should be appreciated that multiple tables 402 and associated forms/reports can be grouped together to form a module.

A safety incident may not always lead to injury, but should be recorded anyway in order to improve safety. An example of one such safety incident can be exposed electrical wires that do not shock anyone. Since this type of safety hazard is dangerous, this type of safety incident should be reported. When designing table structure 400, an administrator tries to define the parameters (factors) that may be later used to analyze safety conditions. These parameters then are used in the creation of corresponding tables 402 and fields 403. For example, such safety parameters can include, but are not limited to, the specific employee, employee's job title, specific action (function) being performed at the time of the incident, type of product being manufactured, specific product being manufactured, supplier of the part, services being provided, shipping method being used, equipment, location and type of safety incident. As shown, table structure 400 has an employee information table 408 that contains relevant information about employees. Employee information table 408 is linked to human resources system 112 such that employee information is up to date. Table 408 contains employee information such as the name, department, and job title for individual employees. Job titles are maintained in job title table 410. An employee with a particular job title may perform a number of functions. Job function table 412 lists the particular functions (actions) employees perform, such as pipe fitting, lifting, etc. A listing of particular safety incidents is maintained in incidence table 414. For example, such safety incidents can include, but are not limited to, abrasions, burns, spills, back injuries, exposed electrical connections and unsafe working conditions.

Shipping method table 416 is used in the identification of the shipping method used, such as moving with a fork truck, when an accident during shipping occurs. Individual safety incidents and corresponding parameters are recorded in incidence report table 418. The information in table 418 can later be used to determine underlying sources of safety problems. Department table 420 maintains information for identifying particular departments, and products table 422 contains information used for the identification of particular products. Supplier table 424 contains supplier information for particular supplies, such as assembly parts. It should be appreciated that tables 422 and 424 can be linked to purchasing system 116 in order to keep their information current. Certain manufactured products may be related. For example, a plant may manufacture a number of different types of toothpaste. Although the types of toothpaste may differ, their differences in regards to safety concerns may be insignificant. Category table 426 allows certain products to be grouped together so that the products can be analyzed as a whole.

Employee training information is maintained in training table 406. Certain safety incidents may be improved with specific types of training programs. With training table 406, specific incidents can be related to specific training programs. With this, safety system 102 can provide recommended training programs when a safety incident occurs. Training table 406 also tracks whether an employee's training status for a particular training program has expired. Equipment table 428 and property table 430 respectively maintains information about particular equipment and property locations. Equipment table 428 can help in determining what role equipment plays in safety incidents. Likewise, table 430 is used to determine locations role in safety incidents. It should be understood that tables 428 and 430 can be kept current by linking them with accounting system 114. Additional employee information table 432 maintains employee information that might not be stored in human resources system 112. One benefit of using a relational database structure is that additional tables can be added later so that new safety parameters can be analyzed.

Figure 5:
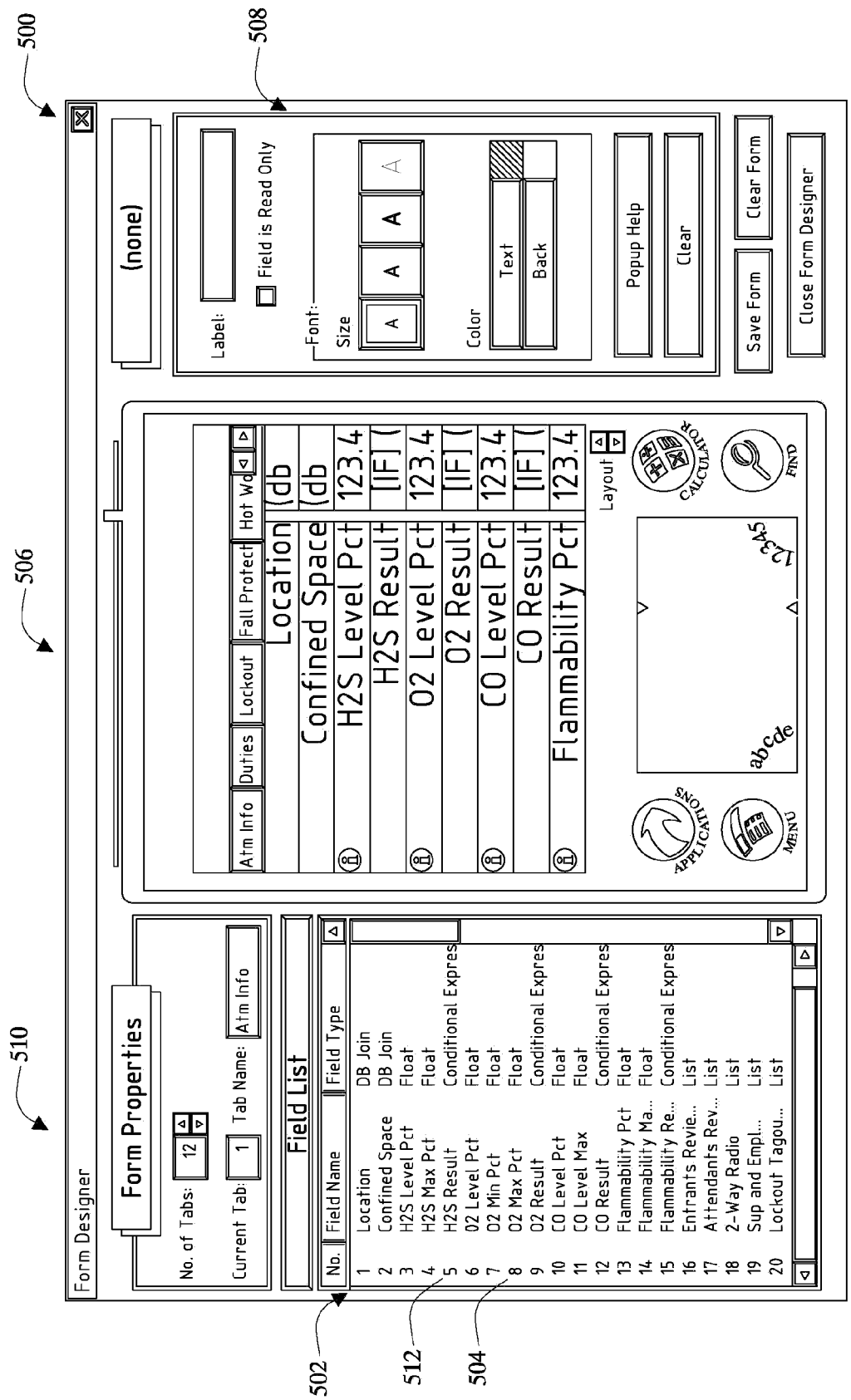
FIG. 5 shows a view of a data form design screen for the system of FIG. 1.

After database 120 has bee initially configured, the administrator with administrative computer 104 can define particular modules that can be used for data entry and/or for supplying information to personnel. The administrator can select the particular table(s) 402 that will be incorporated into the module. The administrator can also design and/or select the data entry form(s) that will be used to enter the data, and the administrator can format reports that can be incorporated into the particular module. FIG. 5 illustrates an example of form design screen 500 that is used to design a particular data entry form. Screen 500 includes a field selection portion 502 in which the administrator can select particular data entry fields 504 that will be shown on the data entry form. Sample form portion 506 shows how the form will appear to the end user, and formatting portion 508 allows the administrator to format the appearance of the data entry form. Format properties portion 510 can be used to format the data entry form. In the data entry form, the administrator can include conditional expression fields 512 that change in response to user input. In this illustrated example, the form being designed is for a confined spaces module.

Figure 6:
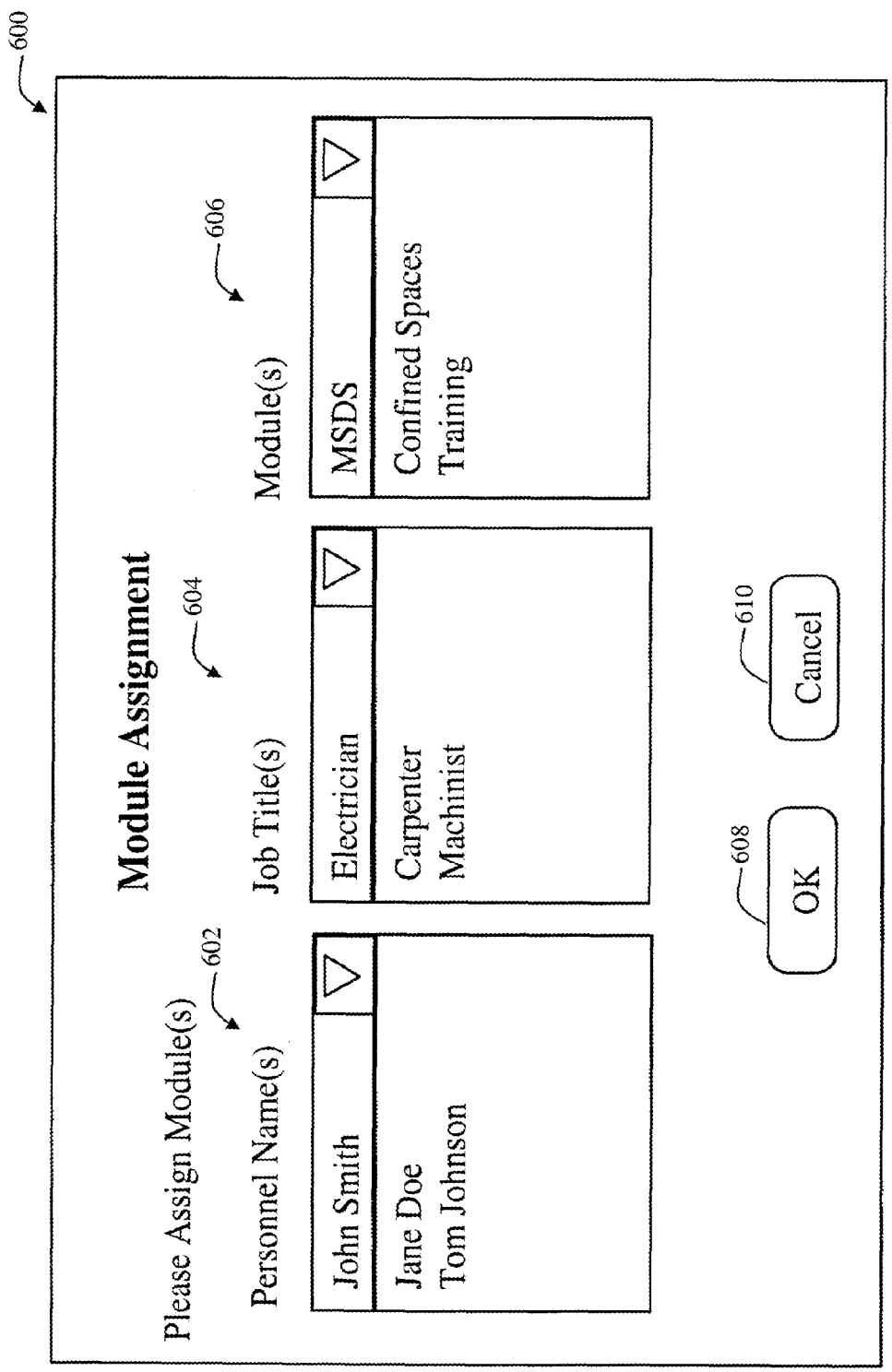
FIG. 6 shows a view of a module selection screen for the system of FIG. 1.

After safety system 102 has been initially configured, safety system 102 then can receive and analyze safety data. In stage 304 (FIG.3), the supervisor (or some other person) using client computer 108 designates the module(s) a particular user will use. As illustrated in FIG. 6, module assignment screen 600 is used to designate the modules that a single user or group of users will use. Screen 600 includes a personnel selection field 602, job title selection field 604, module designation field 606, OK button 608 and Cancel button 610. It should be appreciated that other buttons and controls can be used for navigation and data entry. In one form, the supervisor can select the specific modules that a user will use. Users are selected in the personnel field 602 and the module(s) that the user will use are selected in modules field 606. To confirm the selection, the supervisor selects button 608, and the module assignment information is stored in safety system 102. To cancel the entry, the supervisor can select button 610. Alternatively or additionally, the supervisor can assign modules based on specific job titles. For example, by selecting "electrician" in job title field 604 and "training" in modules field 606, portable devices 110 for the electricians will receive a training module.

Both computers 108 and portable devices 110 can be used to collect and display data. The description below will describe data entry with respect to portable devices 110. It should be understood that this description is equally applicable to computers 108. In stage 306, after the modules have been initially assigned, synchronization controller 118 downloads the modules onto portable devices 110 of the designated users. Each portable device 110 either contains software and/or is hardwired to contain an identifier for the user that is using the specific portable device 110. To download the modules, the user can dock (connect) portable device 110 with client computer 108, which in turn communicates with synchronization controller 118. In another form, portable device 110 can connect to synchronization controller 118 through a wireless connection with network 106. It should be appreciated that portable device 110 can establish a connection with synchronization controller 118 in other manners. Once the connection is established, controller 118 identifies the user through the user identifier stored in the particular portable device 110. Based on the module assignment information stored in safety system 102, controller 118 downloads from safety system 102 the appropriate modules onto portable device 110 of the user. At the same time, any information that was previously entered by the user into portable device 110 is uploaded into (synchronized with) database 120. It should be appreciated that bidirectional control of synchronization can be put in place by either the supervisor and/or administrator.

Figure 7:
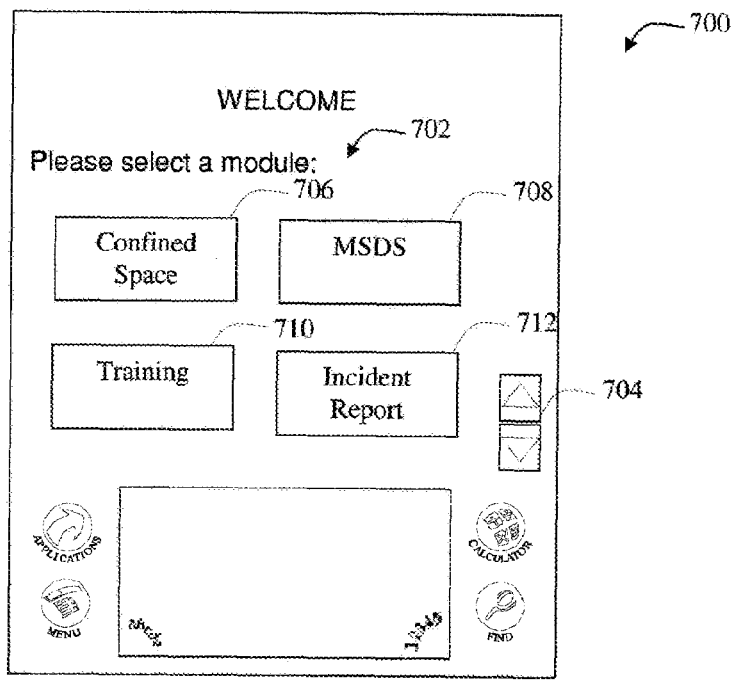
FIGS. 7-17 show a number of tabbed views of a confined spaces data entry screen for the system of FIG. 1.

After the modules have been downloaded into portable device 110, the user in stage 308 can utilize the modules. With the modules, the user can review safety information and/or enter safety information. After startup, portable device 110 displays welcome screen 700, which is shown in FIG. 7. The user can pick modules by selecting a module button 702. Vertical scroll bar 704 is used for scrolling in order to display additional information, such as more buttons 702 on screen 700. In the illustrated example, module buttons 702 include a confined space module button 706, a material safety data sheet (MSDS) module button 708, a training module button 710 and an incident report module button 712. The user enters a module by selecting one of the buttons 702. The MSDS module can be stored over multiple memory cards 204.

Figure 8:
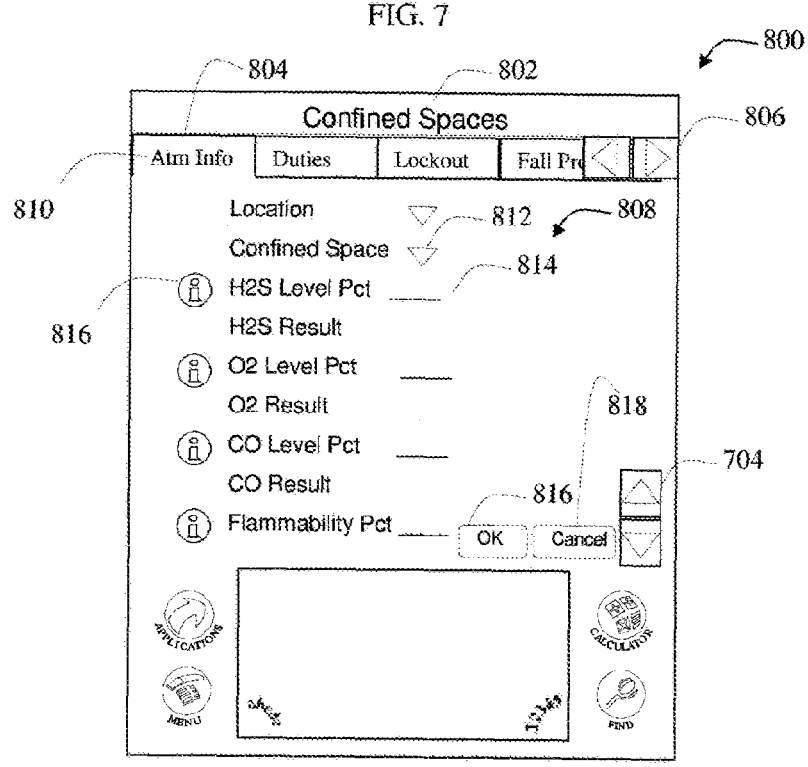
Figure 9:
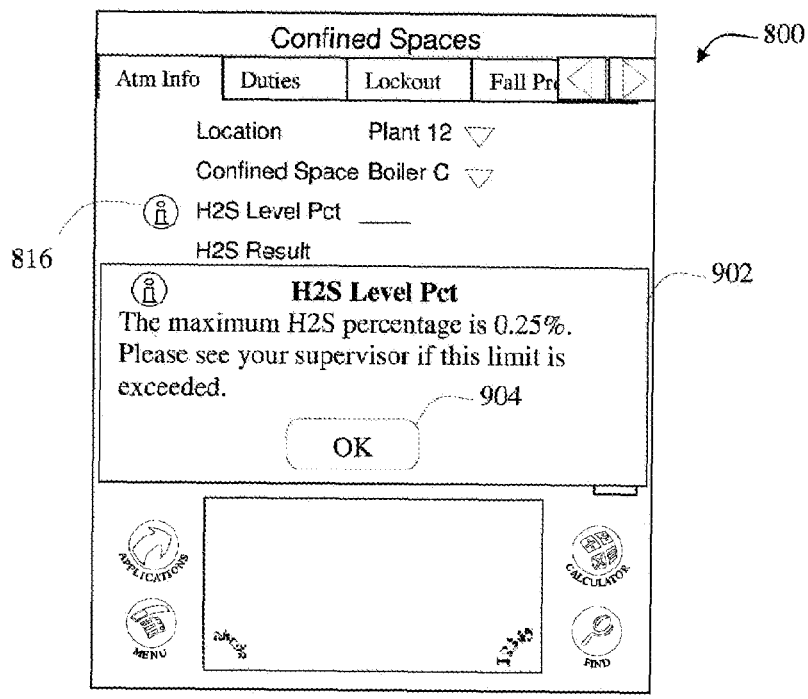
Figure 10:
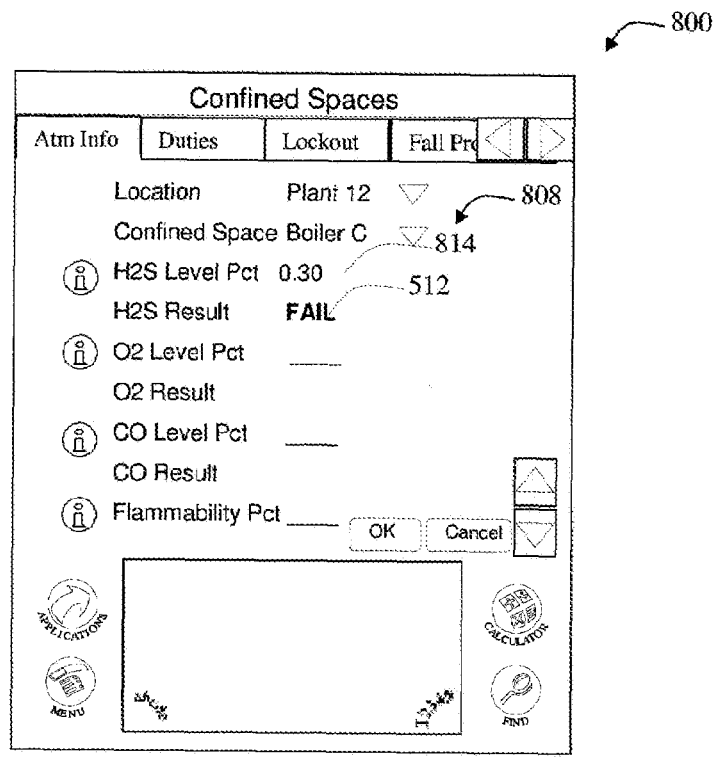

For example, by selecting confined spaces module button 706, a confined space data entry form 800 (FIG. 8) is displayed. Form 800 can be used when employees work in tight spaces, such as within tanks, to help ensure that employees follow proper safety protocols. Further, the information collected with form 800 can later be used during safety analysis. As illustrated, form 800 includes a title 802 to identify the module, one or more tabs 804, a tab scroll bar 806, and one or more fields 808. Each tab 804 is used to display a set of fields 808 for a single database record in the module. In the illustrated example, atmosphere tab 810 is active and fields 808 related to atmospheric conditions in the confined space are displayed. Additional tabs 804 can be viewed by scrolling with tab scroll bar 806. The user can enter information into fields 808 in a number of different manners. For example, drop down lists 812 can be used to display lists of information that are were transferred from database 120 during stage 306. The user can manually enter data into manual entry fields 814. If the user has a question about a field 808, the user can select information button 816. In response, as shown in FIG. 9, a pop-up window 902 is displayed that contains additional information about the selected field 808. In the illustrated example, the user is told the maximum percentage of $H_2S$ allowed. After reading window 902, the user can select OK button 904 in order to close window 902. As shown in FIG. 10, conditional field 512 changes based on the data entered into manual entry field 814. In this example, the percentage of $H_2S$ entered (0.30%) exceeded that limit of 0.25%, and form 800 notifies the user in field 512 that the entered amount exceeded the safety limits.

Figure 11:
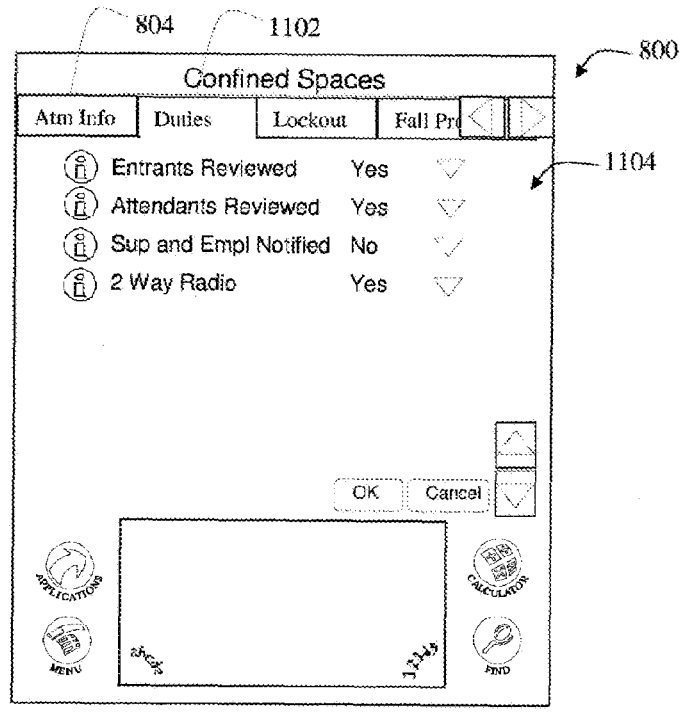
Figure 12:
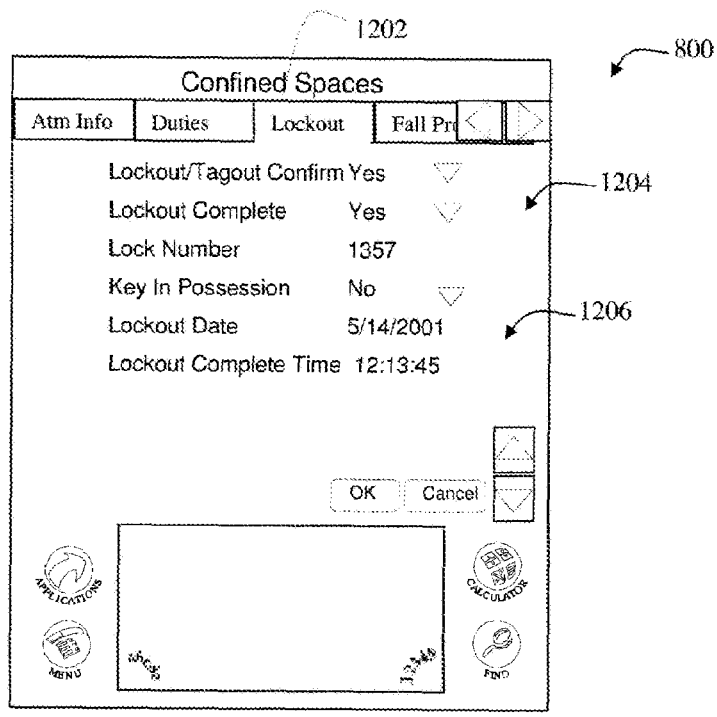
Figure 13:
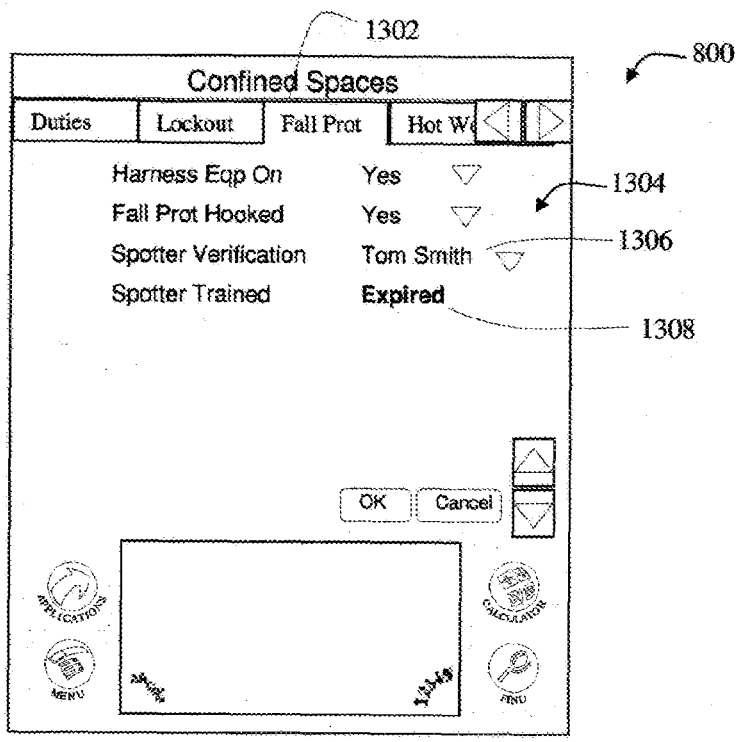

By selecting duties tab 1102 (FIG. 11), a list of duties appear, which are shown by duty checklist fields 1104. The user modifies (checks) each checklist field 1104 in order to indicate whether or not each task was done. When lockout tab 1202, which is shown in FIG. 12, is selected, fields 1204 that concern lockout-tag out procedures are displayed. It should be noted that the dates and times listed in date/time fields 1206 can be manually entered by the user or automatically entered by portable device 110. As shown in FIG. 13, if fall protection tab 1302 is selected, a checklist of fields 1304 related to preventing falls is listed. In the illustrated example, the user entered "Tom Smith" spotter verification field 1306. The confined spaces module that was loaded in stage 306 onto portable device 110 included employee training information from training table 406 (FIG. 4). As illustrated, portable device 110 checks the training information in the confined spaces module to determine that Tom Smith's training certification has expired, and device alerts the user in training verification alert field 1308 that Tom Smith's training has expired.

Figure 14:
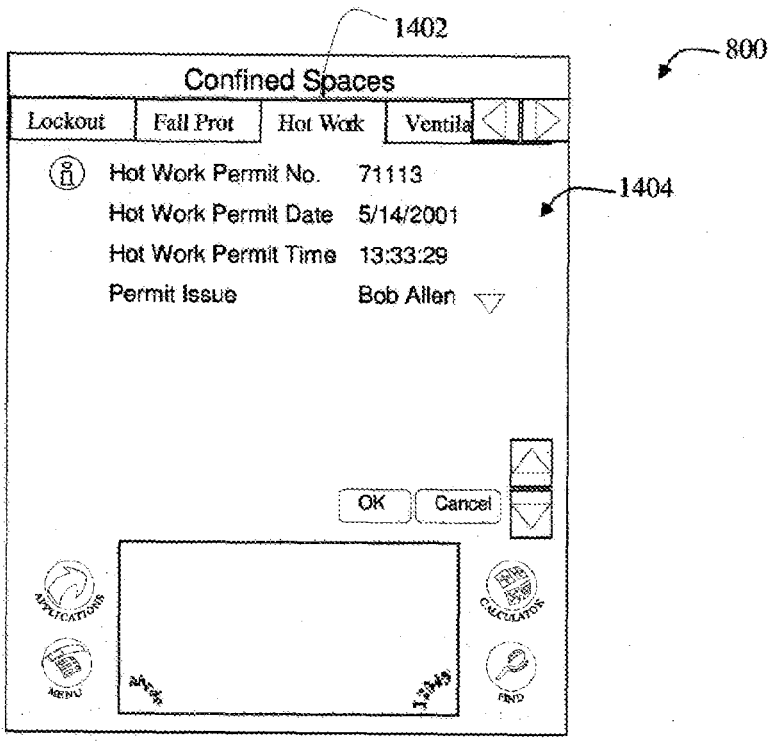
Figure 15:
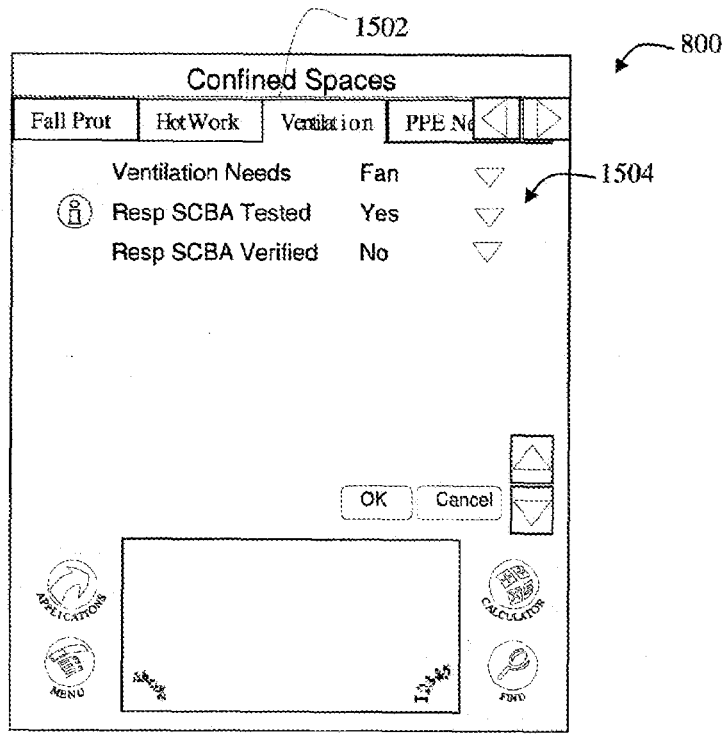
Figure 16:
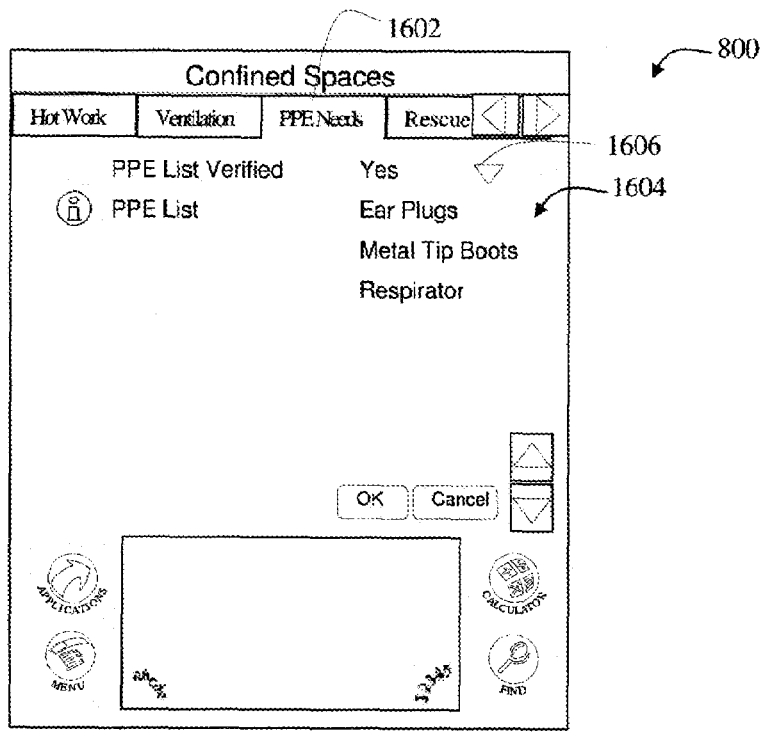
Figure 17:
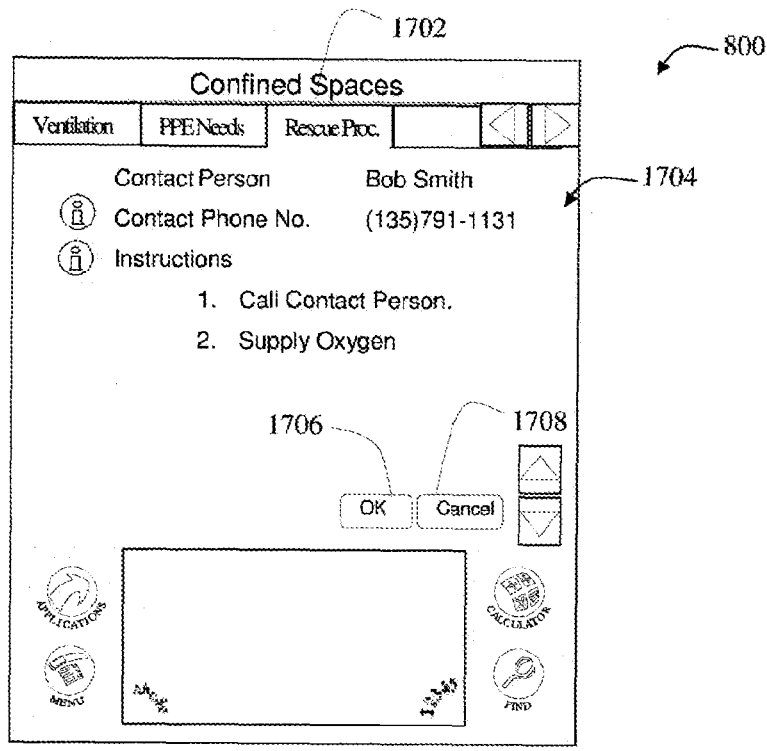

FIG. 14 illustrates that hot work entry fields 1404 are displayed when the user selects hot work tab 1402. Hot work field 1404 can be used to record information such as permit numbers and when the work was performed. Selection of ventilation tab 1502 (FIG. 15) displays fields 1504 that are related to ventilation concerns. The user checks (modifies) each field to confirm that proper ventilation safety procedures and equipment are being used. For example, fields 1504 contain a question asking if the self-contained breathing apparatus (SCBA) has been tested. The user confirms or denies that the testing was done by selecting the appropriate answer. Personal protective equipment (PPE) tab 1602 displays a PPE list 1604 that lists the protective equipment required for the particular confined space. The user verifies that they read PPE list 1604 by answering "yes" or "no" PPE list verification field 1606. In case an emergency arises, the user can review rescue procedures by selecting rescue procedure tab 1702. When tab 1702 is selected, rescue procedure information 1704, such as emergency contact information and instructions, is displayed. A safety record for all the information that was entered in all tabs 804 is stored in the local database module (in this case the confined spaces module) when OK button 1706 is selected. After the record is saved, the user can use the same module in order to create another safety record. To cancel saving of the record and exit from the displayed module, the user can select cancel button 1708.

Figure 18:
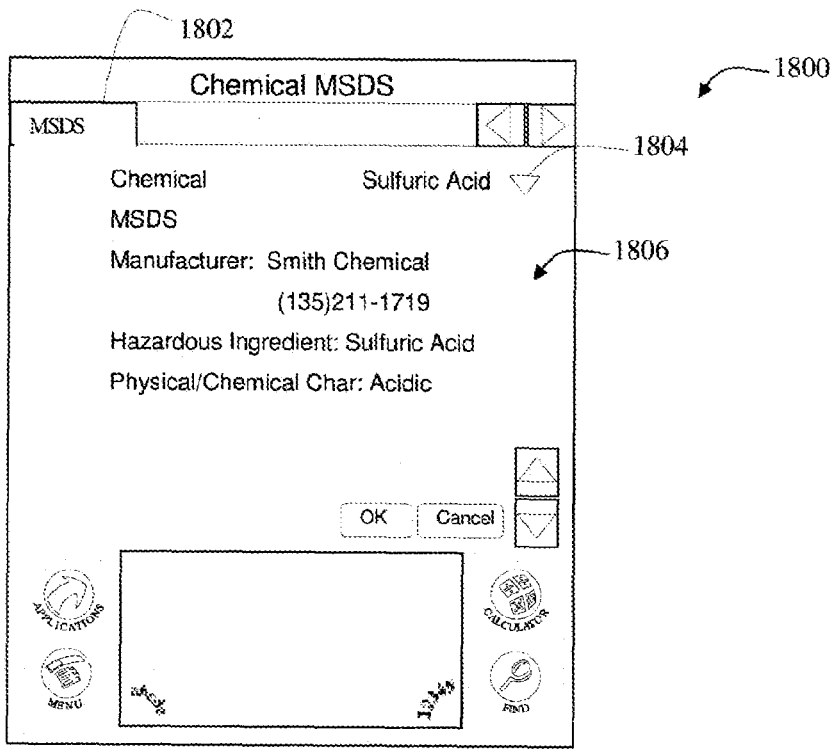
FIG. 18 shows a view of a material safety data sheet screen.

As shown in FIG. 7, the user of portable device 110 can also access current material safety data sheets (MSDS's) by selecting MSDS button 704. After button 704 is selected, MSDS form 1800 (FIG. 18) is displayed. The illustrated MSDS form 1800 has a single MSDS tab 1802, but it should be understood that form 1800 and other types of forms can have multiple tabs. In form 1800, the user designates a chemical by entering and/or selecting the chemical in chemical entry field 1804. Portable device 110 retrieves the MSDS from the data stored in the MSDS module and displays material safety information in material information area 1806. The user can review other MSDS's by entering different chemicals in field 1804. If one of the users does not have the MSDS for a particular chemical, the user can download the MSDS from another portable device 110 by linking the two devices 110 through IR transceivers 212 (FIG. 2). Users can also swap memory cards 204 in order to download an MSDS.

Figure 19:
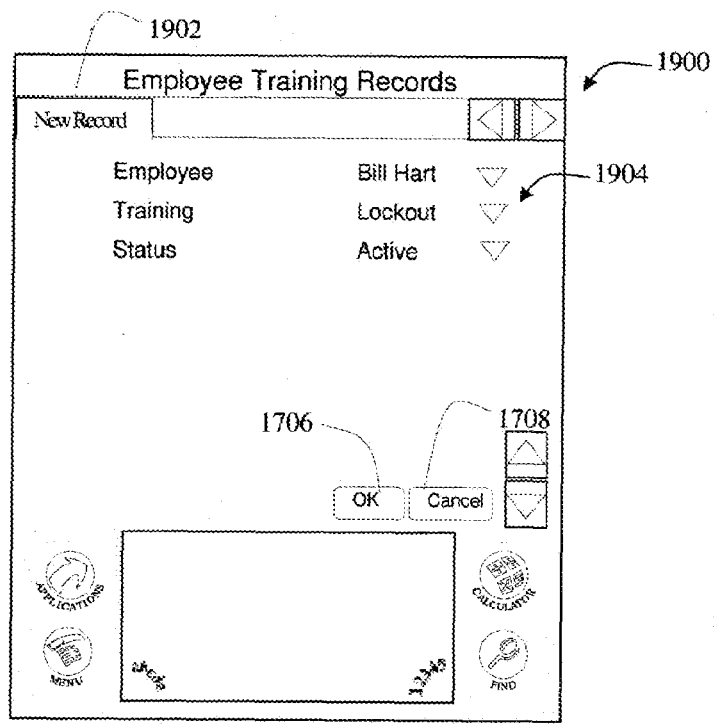
FIG. 19 shows a view of an employee training record entry screen.

Portable device 110 can also be used to maintain personnel training records. Selecting training button 710 in welcome screen 700 (FIG. 7) initiates training records entry form 1900, which is shown in FIG. 19. Form 1900 displays insert new record tab 1902. As discussed above with reference to FIG. 4, training module 404 includes the information stored in training table 406 along with form 1900. In stage 304, training module 404 was downloaded into portable device 110. With module 404, the user can access, modify and add personnel training records. In the illustrated form 1900, the user can enter training record information for a particular employee in training record fields 1904. This training information is stored in training module 404 on portable device 110, and later this information in module 404 is synchronized with training table 406 in order to update the training information stored in database 120.

Figure 20:
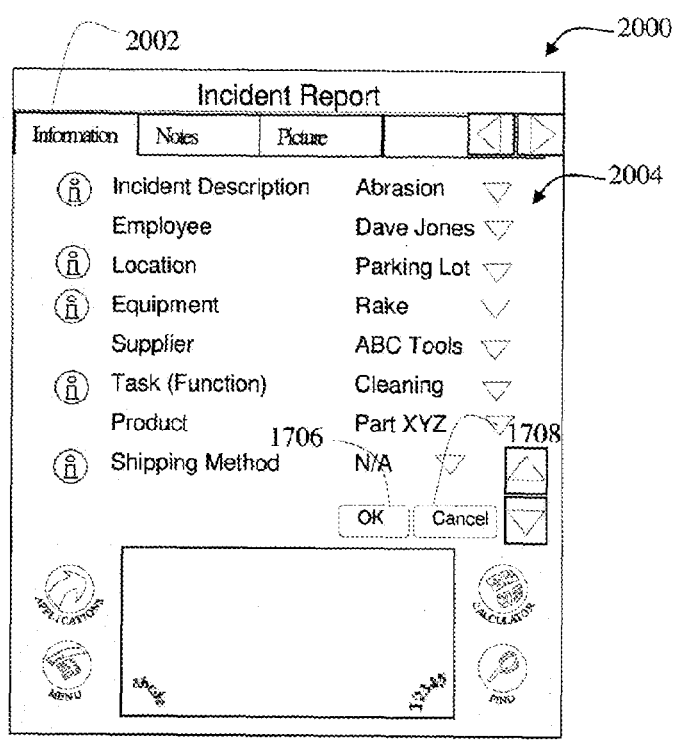
FIGS. 20-22 show a number of views for a safety incident report form screen.
Figure 21:
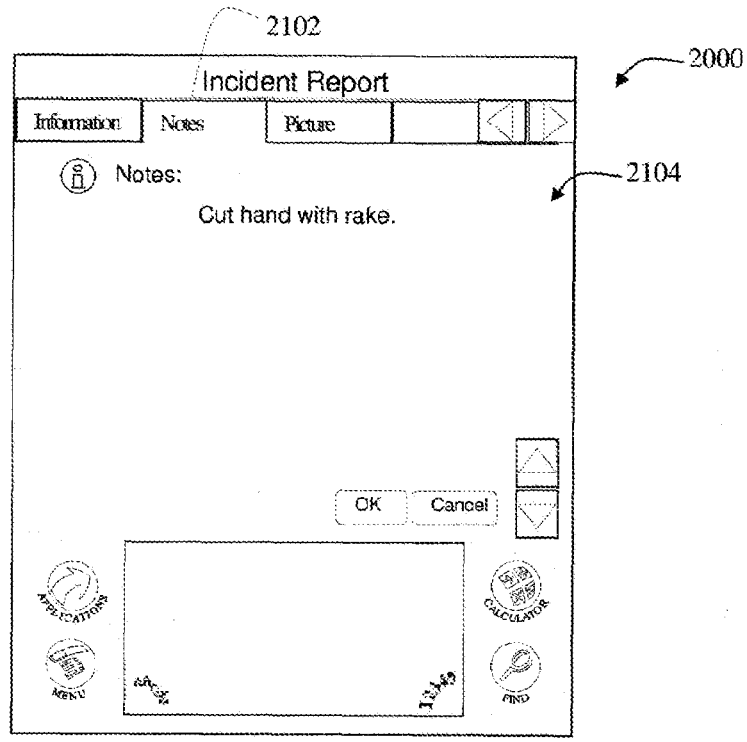
Figure 22:
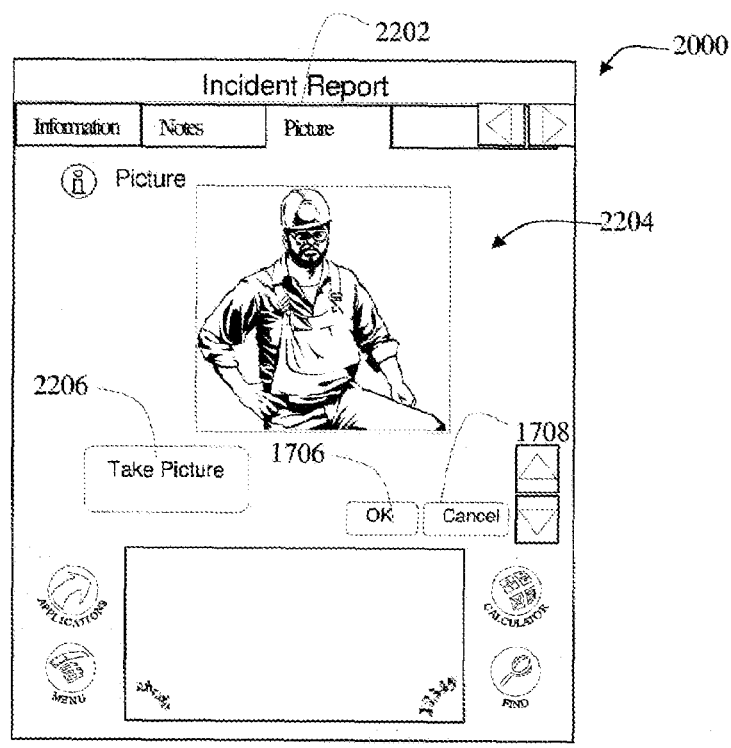

Any safety incidents that occur can be reported by selecting incident report button 712 (FIG. 7). In response, the user is shown an incident report from 2000, which is shown in FIG. 20. Information tab 2002 displays a number of fields 2004 in which information about the safety incident is entered. Fields 2004 record information about the safety parameters that are later used to analyze safety rates. This information entered into fields can include the type of incident, name of the involved employee, incident location, equipment involved, supplier, task being performed, the product and other types of information. As illustrated in FIG. 21, notes about the safety incident are entered through the selection of notes tab 2102, and the notes are entered into notes field 2104. Pictures related to the safety incident can be recorded by selecting picture tab 2202 (FIG. 22). To take the picture, the user connects digital camera 210, which is shown in FIG. 2, to portable device 110. An image 2204 from camera 210 is displayed, and to record image 2204, the user selects take picture button 2206. In order to record the incident, the user selects OK button 1706.

Figures 23, 24:
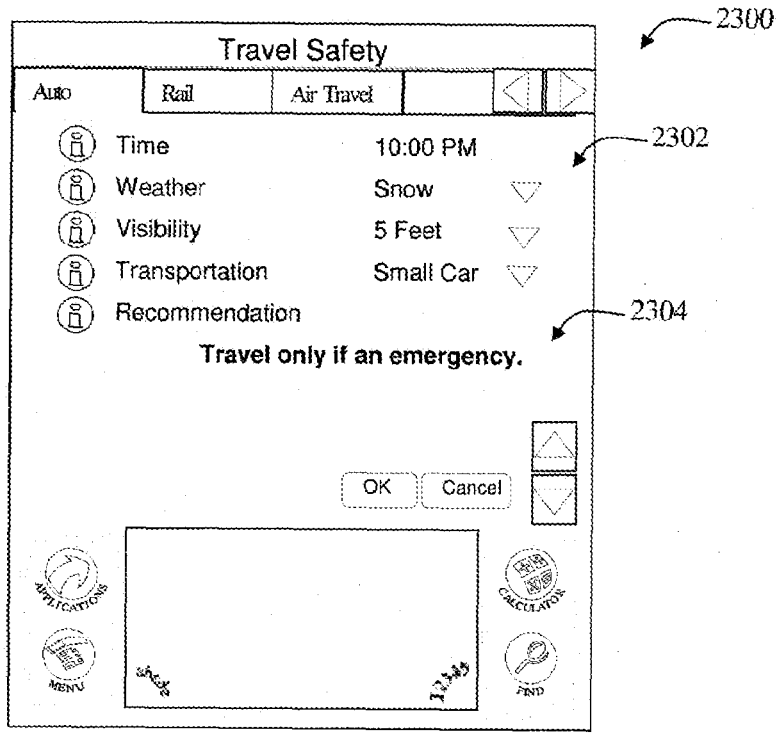
FIG. 23 shows a view of a travel safety screen.
FIG. 24 illustrates a sample safety alert email.

Safety management system 102 can further encompass safety concerns outside the physical location of the company. These safety incidents outside company property may indirectly affect company profitability through such problems as lost work time and increased insurance premiums. For example, safety system 102 is adapted to provide safety guidance even when the employee is outside of work. One such example where safety system 102 can help is shown in FIG. 23. In this example, a travel safety form 2300 is used to provide employees safety guidance during travel, such as when commuting to work. The user of portable device 110 (and/or computer 108) enters travel conditions into fields 2302. Safety system 102 through the travel module stored on device 110 provides guidance relating to current travel conditions with travel recommendation field 2304.

At the end of the work day or once a task is completed, for example, the user in stage 310 (FIG. 3) synchronizes the modules on portable device 110 or computer 108 with safety system 102. It should be appreciated that portable 110 device or computer 108 can be adapted to constantly synchronize their modules with safety system 102. During stage 310, synchronization controller 118 uploads any newly entered information from portable device 110 into database 120. At the same time, controller 118 downloads any new modules and/or information into portable device 110. This synchronization ensures that both safety system 102 and portable devices 110 (and computers 108) have current information.

In stage 312 (FIG. 3), reports are generated and the safety information stored in database 120 is analyzed. An example of one such report is illustrated in FIG. 24. In this example, a manager or president of a company wants to be notified whenever a serious safety incident occurs. Whenever a serious safety incident occurs, safety system 102 automatically sends a safety alert email 2400 to the president so as to alert the president of the incident. It should be appreciated that safety system 102 can be adapted to generate and send other types of reports. For example, safety system 102 can generate a Pareto Chart of safety incidents and parameters (factors) so that the largest sources of safety problems can be identified.

By having the ability to collect a large number of parameters for safety incidents, safety system 102 has the ability to analyze and predict future safety incident rates based on these parameters. Further, safety system 102 is flexible so that new parameters can be added and analyzed. Safety system 102 is adapted to provide scenario analysis so that any business plan now has the ability to incorporate safety costs in estimating the total cost of a future project. Managers can use these scenarios to determine if a new program will be cost effective. Once safety costs are factored into the total cost of the project, the project may appear less desirable. For example, the gains in sales profits from increased production rates may be offset by the safety costs incurred.

Flow diagram 2500 in FIG. 25 illustrates a technique for forecasting future safety incidences based historical safety information according to one embodiment of the present invention. In stage 2502, processor 122 retrieves safety incidents and corresponding safety parameter information from database 120 (memory 124). As discussed above, a safety incident includes both potential and actual safety problems. For example, an exposed electrical wire is reported as a safety incident in safety system 102 even though no one was actually injured. As mentioned above, safety parameters for each safety incident are entered into database 120. The safety parameters can include factors that increase safety risks as well as reduce safety risks. Equation (1), below, provides a model for understanding how safety parameters (P) affect safety incidence (I).

$$I = aP_1 + bP_2 + cP_3 + \ldots + nP_n \quad (1)$$

where:
I=Incidence
$P_{1\ldots n}$=Safety Parameters
a,b,c, . . . n=Parameter Coefficients In Equation (1), both incidence (I) and safety parameters (P) are known from the safety information stored in database 120. In one embodiment, incidence (I) and safety parameters (P) are modeled in a binary format. For example, incidence (I) equals one (1) when a safety incident occurs and equals zero (0) when no safety incident occurs. Similarly, the safety parameter (P) equals one (1) when the parameter exists and equals zero (0) when the parameter does not exist. For example, if one of the safety parameters (P) was wearing safety glasses, this safety glass parameter could be defined to equal one (1) if the person was not wearing safety glasses and to equal zero (0) if the person was wearing safety glasses. It should be appreciated that incidence (I) and safety parameters (P) can modeled with other numerical formats, such as with fractional numbers. Although both incidence (I) and parameters (P) are known, the coefficients (a,b,c, . . . n) for the safety parameters are unknown. The coefficients (a,b,c, . . . n) can either be positive or negative depending on how their corresponding parameters (P) are defined and how the parameters (P) affects incidence (I).

In stage 2504, processor 122 determines the parameter coefficient (a,b,c, . . . n) from the retrieved parameter and safety incident information. Processor 122 uses a mathematical technique order to determine the parameter coefficients (a,b,c, . . . n). In order to further explain this technique, Equation (2) is below. Equation (2) expands upon Equation (1) so as to account for multialo incidences (i) at different time periods (t).

$$I_{it} = aP_{1t} + bP_{2t} + cP_{3t} + \ldots + nP_{nt} \quad (2)$$

In order to provide a practical example for using Equations (1) and (2), an example of safety incidences and parameters that can be stored in database 120 are summarized below in Table 1.

TABLE 1

| Time Period | Safety Incident | | No Eyeglasses | Located In Plant #13 | Training |
|---|---|---|---|---|---|
| | $(I_1)$ | $(I_2)$ | $(P_1)$ | $(P_2)$ | $(P_3)$ |
| 1 | Eye Injury | | No | Yes | Yes |
| 2 | Eye Injury | | Yes | Yes | Yes |
| 3 | Eye Injury | | No | Yes | Yes |
| 4 | | Exposed Wire | Yes | No | No |
| 5 | | Exposed Wire | Yes | Yes | No |

As shown in Table 1 above, safety incidences $I_{1t}$ are eye injuries and safety incidences $I_{2t}$ are exposed electrical wires. Parameters $P_1$ are used to indicate whether no eye protection was worn. Parameter $P_2$ is used to indicate whether the incident occurred in plant number thirteen (13), and $P_3$ indicates whether the employee was trained. It should be understood that more parameters and/or other types of parameters can be used. Using Equation (2), the information in Table 1 is translated into Equation Set (3), which is shown below.

First Time Period $$I_{11} = aP_{11} + bP_{21} + cP_{31} \rightarrow 1 = a(0) + b(1) + c(1)$$

Second Time Period $$I_{12} = aP_{12} + bP_{22} + cP_{32} \rightarrow 1 = a(1) + b(1) + c(1)$$

Third Time Period $$I_{13} = aP_{13} + bP_{23} + cP_{33} \rightarrow 1 = a(0) + b(1) + c(1) \quad (3)$$

Fourth Time Period $$I_{24} = aP_{14} + bP_{24} + cP_{34} \rightarrow 1 = a(1) + b(0) + c(0)$$

Fifth Time Period $$I_{25} = aP_{15} + bP_{25} + cP_{35} \rightarrow 1 = a(1) + b(1) + c(0)$$

As shown above, the incidence rate of eye injuries $(I_1)$ at the first, second and third time periods are respectively $I_{11}$, $I_{12}$, and $I_{13}$. The incidence rates of exposed electrical wires $(I_2)$ at the fourth and fifth time periods are respectively $I_{24}$ and $I_{25}$. In this particular example, zero (0) indicates a "No" answer and one (1) indicates a "Yes" answer for the parameter. Combining incidence types from Equation Set (3) results in the following Equation Set (4).

Eye Injuries($I_1$)

$$3 = a + 3b + 3c \qquad (4)$$

Exposed Electrical Wires($I_2$)

$$2 = 2a + b$$

From these resulting equations, a number of mathematical algorithms can be used in order to determine the coefficients. In one form, regression analysis is used to determine the coefficients, and in one particular embodiment, linear regression analysis is used. To solve these sets of equations, processor 122 can use a custom software program, a commercially available software program, or a combination of these in order to determine the coefficients. In one embodiment, processor 122 uses the regression analysis tool (add-in) for the EXCEL brand spreadsheet (Microsoft Corporation, Redmond, Wash.). In this particular embodiment, the least squares method of regression analysis is used to determine the coefficients.

After the parameter coefficients are determined, future safety incidences, in stage 2506, can be predicted (modeled) using the historical safety data in database 120. Equation (5) below provides a simplified model that will be used in describing the forecasting/planning technique according to one embodiment of the present invention. In Equation (5), parameter $P_1$ concerns production rate and $P_2$ concerns the number of training hours. Previously, in stage 2504, safety system 102 determined that for P1 coefficient a=1.5 and that for $P_2$ coefficient b=-0.8.

$$I = aP_1 + bP_2 = 1.5P_1 - 0.8P_2 \qquad (5)$$

The historical parameter and incidence values stored in database 120 can be used as a baseline for forecasting future safety incidences that can be used in project planning. These baseline parameter values can be adjusted to reflect future courses of action. Safety system 102 can also automatically access accounting system 114 so that cost-benefit analysis reports can be generated based on the model. In the above example, management could use equation (5) to estimate future safety rates (incidences) based on an increased production rate ($P_1$). Management can than use the Equation (5) model to determine the amount of additional training hours ($P_2$) required in order to offset the increased safety incidence rate due to the increased production rate. For example, the incidence rate (I) has historically equaled fifty (50) accidents. Management wishes to keep the incidence rate (I) at the same level while at the same time increase the production rate ($P_1$) to 250 units/hour. Using Equation (5), management can determine the number of training hours ($P_2$) required to accomplish this goal, which is shown in Equation (6) below.

$$I = 1.5P_1 - 0.8P_2 \qquad (5)$$

$$50 = 1.5(250) - 0.8P_2 \Rightarrow P_2 = \frac{375 - 50}{0.8} = 406.25 \qquad (6)$$

Therefore, in this example, management will have to increase the number of training hours to 406.25 hours in order to accomplish this goal. From this management can use cost/revenue information from accounting system 114 to determine whether the revenue gained from the increased production rate would offset the additional training costs. Management can also use this information to prepare a safety budget in order to accomplish specific safety goals. In another example, management can use the modeled future safety incidence rate so as to budget for future expenses, such as increased equipment and training costs. Furthermore, with this tool, future insurance carrier reserves for insurance policies can be more accurately budgeted. It should be appreciated that this safety modeling/forecasting technique can be used in a wide-variety of analysis and planning activities.

While specific embodiments of the present invention have been shown and described in detail, the breadth and scope of the present invention should not be limited by the above described exemplary embodiments, but should be defined only in accordance with the following claims and their equivalents. All changes and modifications that come within the spirit of the invention are desired to be protected.

What is claimed is:

1. A system for remotely collecting safety information and for forecasting one or more future safety incidences based on the collected safety information, comprising:

at least one portable device operable to record safety incidents and corresponding safety parameters that affect safety;

a processor operatively coupled to said portable device, said processor being operable to determine parameter coefficients for the safety parameters based a relationship between the safety incidents and the safety parameters from said portable device, said processor being operable to forecast the future safety incidences based on the parameter coefficients determined by the processor; and wherein said processor is operable to determine the parameter coefficients through the following relationship:

$$I = aP_1 + bP_2 + cP_3 + \ldots + nP_n$$

where:

I=the Safety Incidences $P_{1 \ldots n}$=the Safety Parameters a,b,c, . . . n=the Parameter Coefficients.

2. The system of claim 1, wherein:

said processor is incorporated into a safety management system, said safety management system including memory operatively coupled to said processor, said memory including a database operable to store the safety incidents and the safety parameters; and said portable device is operable to synchronize with said database.

3. The system of claim 2, further comprising:

a client computer operatively coupled to said safety management system, wherein said portable device is adapted to operatively couple to said client computer when said portable device synchronizes with said database; and a network operatively coupling said client computer to said safety management system.

4. The system of claim 3, wherein said safety management system is operable to send a safety alert email across said network whenever at least one of the safety incidents occurs.

5. The system of claim 2, further comprising:

an accounting system operatively coupled to said safety management system, wherein said safety management system is operable to forecast safety costs based on accounting information from said accounting system;

a human resources system operatively coupled to said safety management system, wherein said safety management system is operable to transfer employee training information between said human resources system and said portable device; and a purchasing system operatively coupled to said safety management system, wherein said safety management system is operable place purchase orders for safety equipment with said purchasing system.

6. The system of claim 2, wherein:

said database includes a relational database structured with a plurality data tables; and said portable device is operable to synchronize with a subset of said plurality of data tables.

7. The system of claim 1, further comprising a detachable device detachably coupled to said portable device for inputting at least part of the safety information into said portable device.

8. The system of claim 7, wherein said detachable device includes a sensor to input sensor readings into said portable device.

9. The system of claim 1, wherein said processor is operable to determine the parameter coefficients through regression analysis.

10. A method of forecasting future safety rates based on historical safety information, comprising:

receiving historical safety incidences and corresponding safety parameters with a processor, wherein the safety incidences reflects a rate at which safety problems occur and the safety parameters reflect factors that affect safety;

determining parameter coefficients for each of the safety parameters with the processor, wherein each of the safety parameters has a respective one of the parameter coefficients that in combination affect the historical safety incidences; and predicting future safety incidences based on the parameter coefficients with the processor after said determining.

11. The method of claim 10, further comprising:

retrieving cost information from an accounting system operatively coupled to the processor; and estimating future safety costs based at least on the cost information and the future safety incidences.

12. The method of claim 10, further comprising:

downloading in memory operatively coupled to the processor at least part of the historical safety incidence rates and the corresponding safety parameters from a portable device; and wherein said receiving includes retrieving the historical safety incidence rates and the corresponding safety parameters from the memory.

13. The method of claim 12, wherein:

the memory includes a relational database having a plurality of data tables; and said downloading includes synchronizing a subset of the plurality of data tables with the portable device to improve memory utilization on the portable device.

14. The method of claim 10, wherein said determining the parameter coefficients includes computing the parameter coefficients based on the following relationship:

$$I = aP_1 + bP_2 + cP_3 + \ldots + nP_n$$

where:

I=the Safely Incidences $P_1 \ldots _n$=the Safely Parameters a,b,c, . . . n=the Parameter Coefficients.

15. The method of claim 14, wherein said determining the parameter coefficients includes estimating the parameter coefficients through regression analysis.

16. The method of claim 10, further comprising generating a safety report including the future safety incidences.

17. A system for forecasting future safety rates based on historical safety information, comprising:

means for collecting historical safety incidences and corresponding safety parameters, wherein the historical safety incidences reflect a rate at which safety problems occur and the safety parameters reflect factors that affect safety;

means for determining parameter coefficients for each of the safety parameters, wherein each of the safety parameters has a respective one of the parameter coefficients that in combination affect the historical safety incidences;

means for estimating future safety incidences based on the parameter coefficients; and means for reporting the future safety incidences.

18. A system for remotely collecting safety information and for forecasting one or more future safety incidences based on the collected safety information, comprising:

at least one portable device operable to record safety incidents and corresponding safety parameters that affect safety;

a processor operatively coupled to said portable device, said processor being operable to determine parameter coefficients for the safety parameters based a relationship between the safety incidents and the safety parameters from said portable device, said processor being operable to forecast the future safety incidences based on the parameter coefficients determined by the processor;

an accounting system operatively coupled to said safety management system, wherein said safety management system is operable to forecast safety costs based on accounting information from said accounting system;

a human resources system operatively coupled to said safety management system, wherein said safety management system is operable to transfer employee training information between said human resources system and said portable device; and a purchasing system operatively coupled to said safety management system, wherein said safety management system is operable place purchase orders for safety equipment with said purchasing system.

* * * * *